US012042881B2

(12) United States Patent
Winter

(10) Patent No.: US 12,042,881 B2
(45) Date of Patent: Jul. 23, 2024

(54) SYSTEM AND METHOD FOR LASER DRILLING OF SHAPED COOLING HOLES

(71) Applicant: United Technologies Corporation, Farmington, CT (US)

(72) Inventor: Michael Winter, New Haven, CT (US)

(73) Assignee: RTX Corporation, Farmington, CT (US)

(*) Notice: Subject to any disclaimer, the term of this patent is extended or adjusted under 35 U.S.C. 154(b) by 1466 days.

(21) Appl. No.: 16/220,415

(22) Filed: Dec. 14, 2018

(65) Prior Publication Data

US 2020/0189041 A1    Jun. 18, 2020

(51) Int. Cl.
*B23K 26/384* (2014.01)
*B23K 26/382* (2014.01)
(Continued)

(52) U.S. Cl.
CPC .......... *B23K 26/384* (2015.10); *B23K 26/389* (2015.10); *B23P 15/02* (2013.01); *F01D 5/186* (2013.01); *G02B 3/00* (2013.01); *G02B 6/04* (2013.01); *G02B 6/10* (2013.01); *B23K 2101/001* (2018.08); *B23P 2700/06* (2013.01);
(Continued)

(58) Field of Classification Search
CPC .............. G11B 17/043; G11B 23/0311; G11B 23/0316; G11B 17/0436; G11B 19/10; G11B 2220/2512; B23K 2101/001; B23K 26/0648; B23K 26/073; B23K 26/384; B23K 26/389; B23P 15/02; B23P 2700/06; F01D 5/186; F01D 5/187; F05D 2230/13; F05D 2250/185; F05D 2260/202; F05D 2260/22141; G02B 2003/0093; G02B 27/0927; G02B 3/00; G02B 6/04; G02B 6/10
See application file for complete search history.

(56) References Cited

U.S. PATENT DOCUMENTS 8,525,073 B2    9/2013    Quitter et al.
9,093,822 B1    7/2015    Chann et al.
(Continued)

FOREIGN PATENT DOCUMENTS

JP    2015124115 A   *   7/2015    ........... C03B 29/025
WO   2015/098388 A1    7/2015
WO   2018/012327 A1    1/2018

OTHER PUBLICATIONS

U.S. Office Action dated Aug. 31, 2021 issued for related U.S. Appl. No. 16/220,402.
(Continued)

*Primary Examiner* — Dana Ross
*Assistant Examiner* — Adam M Eckardt
(74) *Attorney, Agent, or Firm* — Bachman & LaPointe, P.C.

(57) ABSTRACT

A laser hole drilling system includes a laser source that generates a laser beam along an optical axis; a spherical lens along the optical axis downstream of the laser source; and a control system in communication with the spherical lens and the laser source, the control system operable to locate the spherical lens with respect to the laser source to produce a light distribution in polar coordinates of a real portion of the Fourier Transform to generate an asymmetric teardrop shaped energy distribution at a focal plane.

8 Claims, 5 Drawing Sheets

(51) Int. Cl.
*B23K 101/00* (2006.01)
*B23P 15/02* (2006.01)
*F01D 5/18* (2006.01)
*G02B 3/00* (2006.01)
*G02B 6/04* (2006.01)
*G02B 6/10* (2006.01)

(52) U.S. Cl.
CPC .... *F05D 2230/13* (2013.01); *F05D 2260/202* (2013.01); *G02B 2003/0093* (2013.01)

(56) References Cited

U.S. PATENT DOCUMENTS

| | | | |
|---|---|---|---|
| 9,250,390 | B2* | 2/2016 | Muendel ............. G02B 6/4216 |
| 2004/0218164 | A1 | 11/2004 | Kohno |
| 2007/0206260 | A1 | 9/2007 | Mochizuki |
| 2009/0071947 | A1 | 3/2009 | Sekiguchi et al. |
| 2010/0110556 | A1 | 5/2010 | Chann et al. |
| 2010/0126973 | A1* | 5/2010 | Frye ................. B23K 26/0823 219/121.71 |
| 2011/0305256 | A1 | 12/2011 | Chann et al. |
| 2012/0132628 | A1 | 5/2012 | Kosmowski et al. |
| 2013/0026935 | A1 | 10/2013 | Starkweather et al. |
| 2015/0331245 | A1 | 11/2015 | Tayebati et al. |
| 2016/0167174 | A1* | 6/2016 | Unger ................... B23K 26/18 219/121.72 |
| 2016/0214208 | A1* | 7/2016 | Hu ...................... B23K 26/146 |
| 2016/0221124 | A1* | 8/2016 | Koonankeil .......... B23K 26/40 |
| 2018/0010484 | A1* | 1/2018 | Reed ................... B23K 26/146 |
| 2018/0088305 | A1* | 3/2018 | Itoh .................... G02B 26/0808 |
| 2018/0141165 | A1 | 5/2018 | Shiner et al. |
| 2018/0185960 | A1 | 7/2018 | Coskun et al. |
| 2018/0238173 | A1 | 8/2018 | Garay et al. |
| 2019/0145623 | A1 | 5/2019 | Fukimoto et al. |

OTHER PUBLICATIONS

European Extended Search Report dated Oct. 8, 2020 issued for European Patent Application No. 19216207.1.
European Search Report dated Jun. 19, 2020 issued for European Patent Application No. 19215802.0.
European Search Report dated Jul. 2, 2020 issued for European Patent Application No. 19216207.1.
U.S. Office Action dated Mar. 7, 2023 issued for related U.S. Appl. No. 16/220,402.

* cited by examiner

SYSTEM AND METHOD FOR LASER DRILLING OF SHAPED COOLING HOLES

BACKGROUND

The present disclosure relates to a method for laser drilling, and more particularly to a method for laser hole drilling of shaped cooling holes for gas turbine engine components.

Gas turbine engines typically include a compressor section to pressurize airflow, a combustor section to burn a hydrocarbon fuel in the presence of the pressurized air, and a turbine section to extract energy from the resultant combustion gases. Gas path components, such as turbine blades, often include cooling that may be accomplished by external film cooling, internal air impingement, and forced convection either separately or in combination. In forced convection cooling, compressor bleed air flows through internal chambers to continuously remove thermal energy. The compressor bleed air enters the internal chambers through one or more inlets to the internal chambers, which then discharge though various hole exits.

Advances in manufacturing have facilitated significantly smaller and more complex internal passages. The cooling air holes are drilled in pre-determined patterns and are contoured to ensure adequate cooling of the airfoil. The cooling air holes duct cooling air from passages on the interior of the airfoil through the hot walls to the exterior. The cooling air provides transpiration cooling as the air passes through the wall and, after the air is discharged from the airfoil, provides film cooling with a film of air on the exterior. The film of cooling air provides a barrier between the airfoil and the hot, working medium gasses.

One process to drill the holes utilizes a laser beam that burns through the wall of the airfoil to form a hole that provides a satisfactory conduit for cooling air. Laser hole drilling is performed by focusing a laser (typically 1026 nm) onto the gas turbine component.

Many components, however, utilize shaped cooling holes. Shaped cooling holes typically include a meter hole with a portion that may not penetrate through the wall. Shaped cooling holes are produced through the use of machining processes such as EDM, which is of a significantly higher cost than laser hole drilling. This issue may drive component design to avoid shaped cooling holes.

SUMMARY

A laser hole drilling system according to one disclosed non-limiting embodiment of the present disclosure includes a laser source that generates a laser beam along an optical axis; a spherical lens along the optical axis downstream of the laser source; and a control system in communication with the spherical lens and the laser source, the control system operable to position the spherical lens with respect to the laser source to produce a light distribution based on polar coordinates of a real portion of the Fourier Transform of a laser plane at the laser source to generate an asymmetric teardrop shaped energy distribution at a focal plane.

A further aspect of the present disclosure includes, wherein the spherical lens is located coaxial with respect to the optical axis.

A further aspect of the present disclosure includes, wherein the focal plane is located at a surface of a turbine component.

A component for a gas turbine engine according to one disclosed non-limiting embodiment of the present disclosure includes a surface with a laser drilled asymmetric teardrop shaped cooling hole.

A further aspect of the present disclosure includes, wherein the surface is a wall of a turbine blade.

A laser hole drilling system according to one disclosed non-limiting embodiment of the present disclosure includes a laser matrix of fiber waveguide lasers arranged in an array; and a control system in communication with the laser matrix, the control system operable to control a laser distribution and intensity between nodes in the array produce a light distribution based on polar coordinates of a real portion of the Fourier Transform of a laser plane at the laser source to generate an asymmetric teardrop shaped energy distribution at a focal plane.

A further aspect of the present disclosure includes, wherein the focal plane is located at a surface of a turbine component.

A further aspect of the present disclosure includes, wherein the surface is a wall of a turbine blade.

A method for laser drilling an asymmetric teardrop shaped cooling hole in a component for a gas turbine engine, according to one disclosed non-limiting embodiment of the present disclosure includes locating a component with respect to a focal plane of a laser; producing a light distribution based on polar coordinates of a real portion of a Fourier Transform of a laser plane at the laser source to generate an asymmetric teardrop shaped energy distribution at the focal plane; and drilling an asymmetric teardrop shaped cooling hole in the component at the focal plane.

A further aspect of the present disclosure includes, wherein the focal plane is located at a surface of a turbine component.

The foregoing features and elements may be combined in various combinations without exclusivity, unless expressly indicated otherwise. These features and elements as well as the operation thereof will become more apparent in light of the following description and the accompanying drawings. It should be appreciated; however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
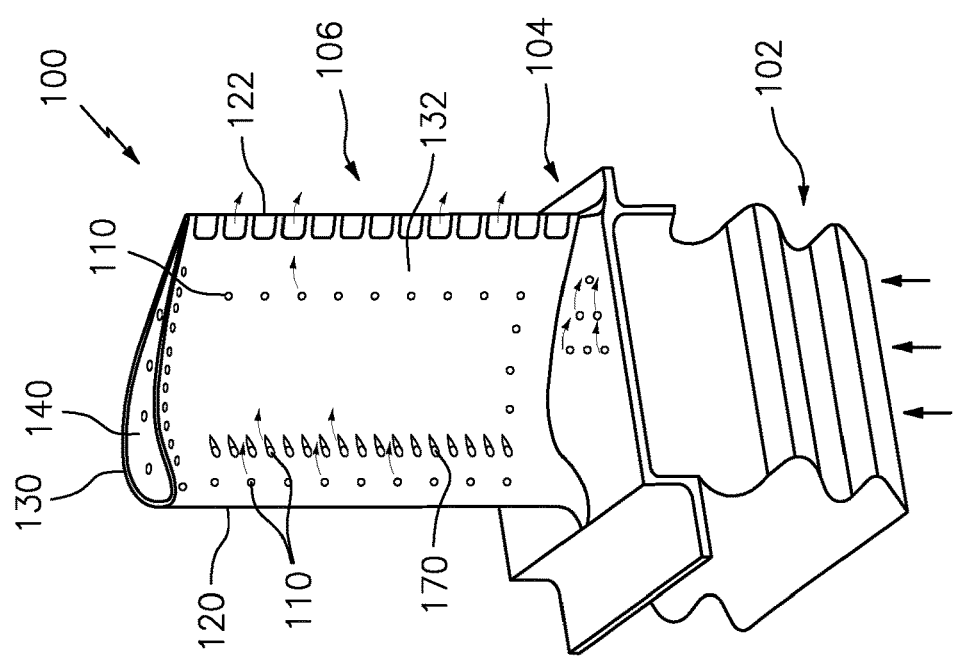
FIG. 1 is a perspective view of an airfoil as an example component.

FIG. 1 schematically illustrates an example blade 100 for a gas turbine engine such as a turbine blade. The blade 100 generally includes a root 102, a platform 104 and an airfoil 106 (also shown in FIGS. 2 and 3). The platform 104 separates a gas path side inclusive of the airfoil 106 and a non-gas path side inclusive of the root 102. The platform 104 generally separates the root 102 and the airfoil 106 to define an inner boundary of a gas path. The airfoil 106 defines a blade chord between a leading edge 120, which may include various forward and/or aft sweep configurations, and a trailing edge 122. A first wall 130 may be convex to define a suction side, and a second wall 132 may be concave to define a pressure side are joined at the leading edge and at the axially spaced trailing edge. A blade tip 140 extends between the walls 130, 132 opposite the platform 104. It should be appreciated that the tip 96 may include a recessed portion.

Figure 2:
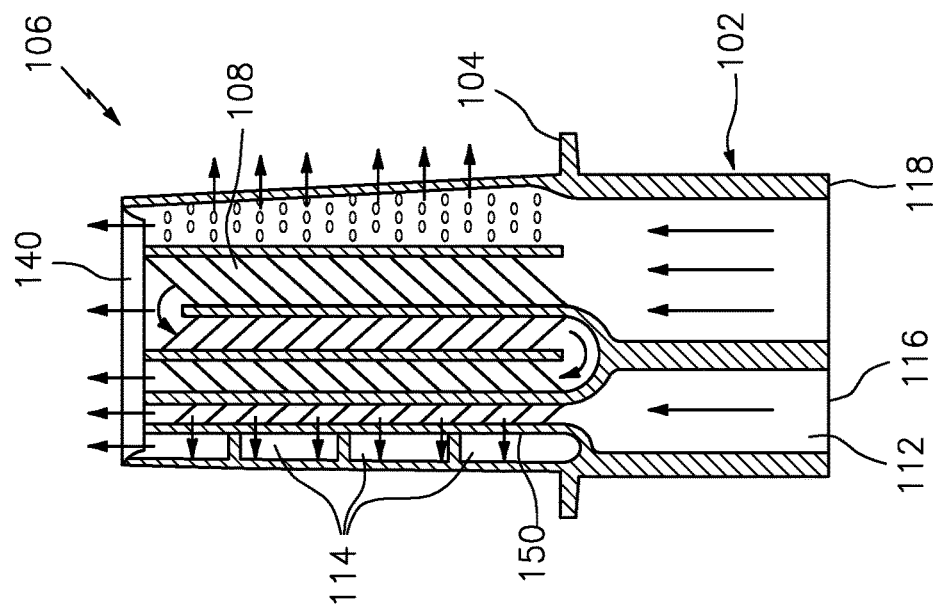
FIG. 2 is a schematic cross-section view of the airfoil of FIG. 1 showing the internal architecture.
Figure 3:
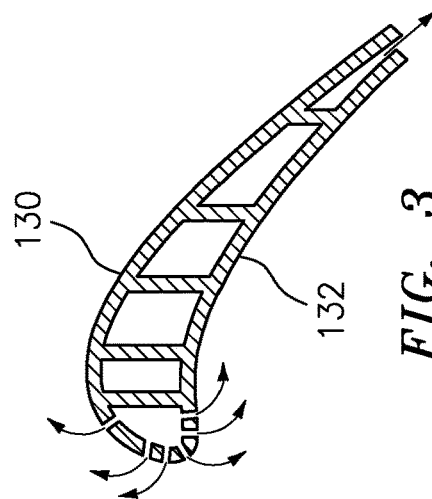
FIG. 3 is a schematic lateral cross-section view of the airfoil of FIG. 1.

To resist the high temperature stress environment in the gas path of a turbine engine, each blade 100 may be formed by casting to include an array of internal passageways 108 (also shown schematically in FIG. 2) that communicate with a multiple of holes 110 (illustrated schematically) that direct cooling air over an outer surface of the airfoil 106, here exemplified by the leading edge 98 (also shown schematically in FIG. 3). It should be appreciated that although a blade 100 with cooling holes will be described and illustrated in detail as one example, other components including, but not limited to, vanes, turbine shrouds, end walls and other components will also benefit herefrom.

With reference to FIG. 2, the array of internal passageways 108 includes a feed passage 112 that communicates airflow into a multiple of leading edge chambers 114 within the blade 100. The feed passage 112 generally receives cooling flow through at least one inlet 116 within a base 118 of the root 102. The multiple of leading edge chambers 114 of a leading edge cavity 122 generally receives cooling flow from the feed passage 112 through respective crossover passages 150. The multiple of holes 110 provide for cooling air egress to an external surface of the blade 100. It should be appreciated that although particular features are delineated within certain general areas, the features may be otherwise arranged or intermingled and still not depart from the disclosure herein. It should also be appreciated that various feed passage architectures; cavities and internal feature arrangements, e.g., pedestals, chevrons, pin fins, chevrons, etc., for the array of internal passageways 108 may also be provided.

Figure 4:
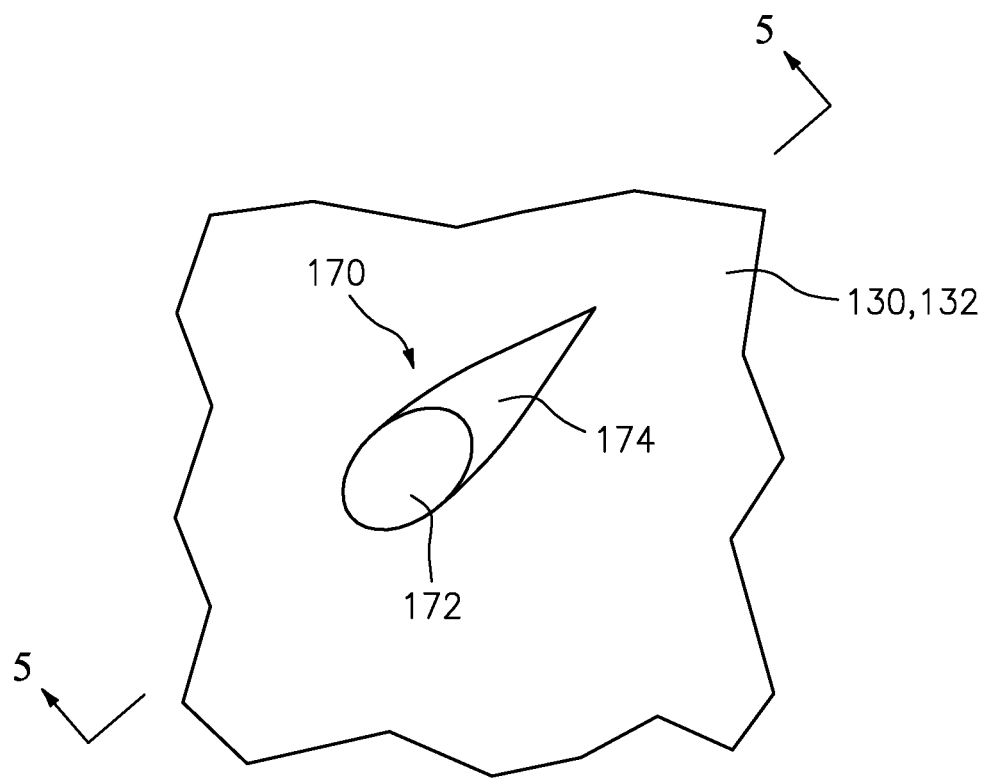
FIG. 4 is a top plan view of a shaped cooling hole.
Figure 5:
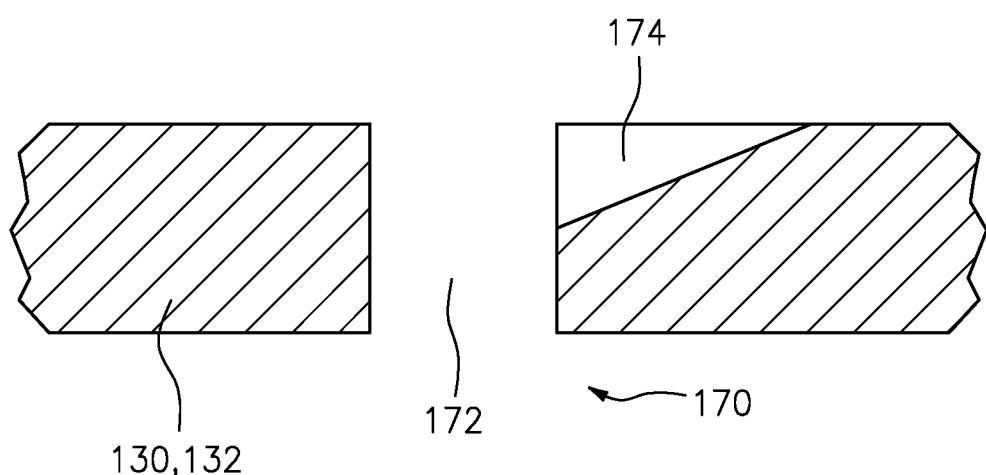
FIG. 5 is a sectional view of the shaped cooling hole taken along line 5-5 in FIG. 4.

The multiple of holes 110 may include a multiple of shaped cooling holes 170 that communicate the cooling airflow from the internal cooling circuit through the wall of the blade 100 to provide external film cooling which allow exit of the internal cooling flow used in forced convection cooling. The shaped cooling holes 170 include a metering hole 172 and a trailing portion 174 that may not penetrate and/or may be angled with regard the walls 130, 132 of the blade 100 to form an asymmetric teardrop shape (FIGS. 4 and 5).

Figure 6:
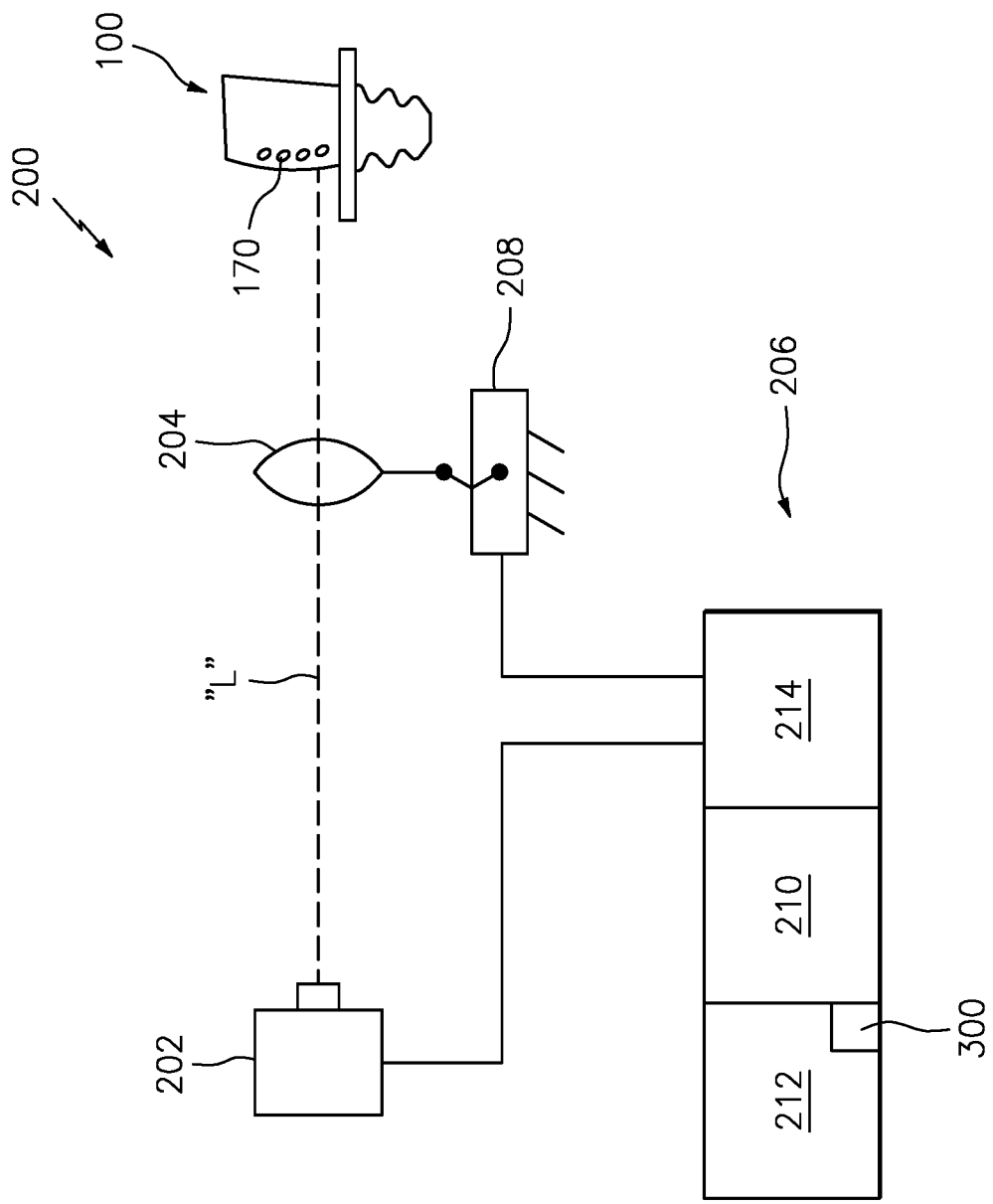
FIG. 6 is a schematic view of a shaped cooling hole laser drilling system.
Figure 7:
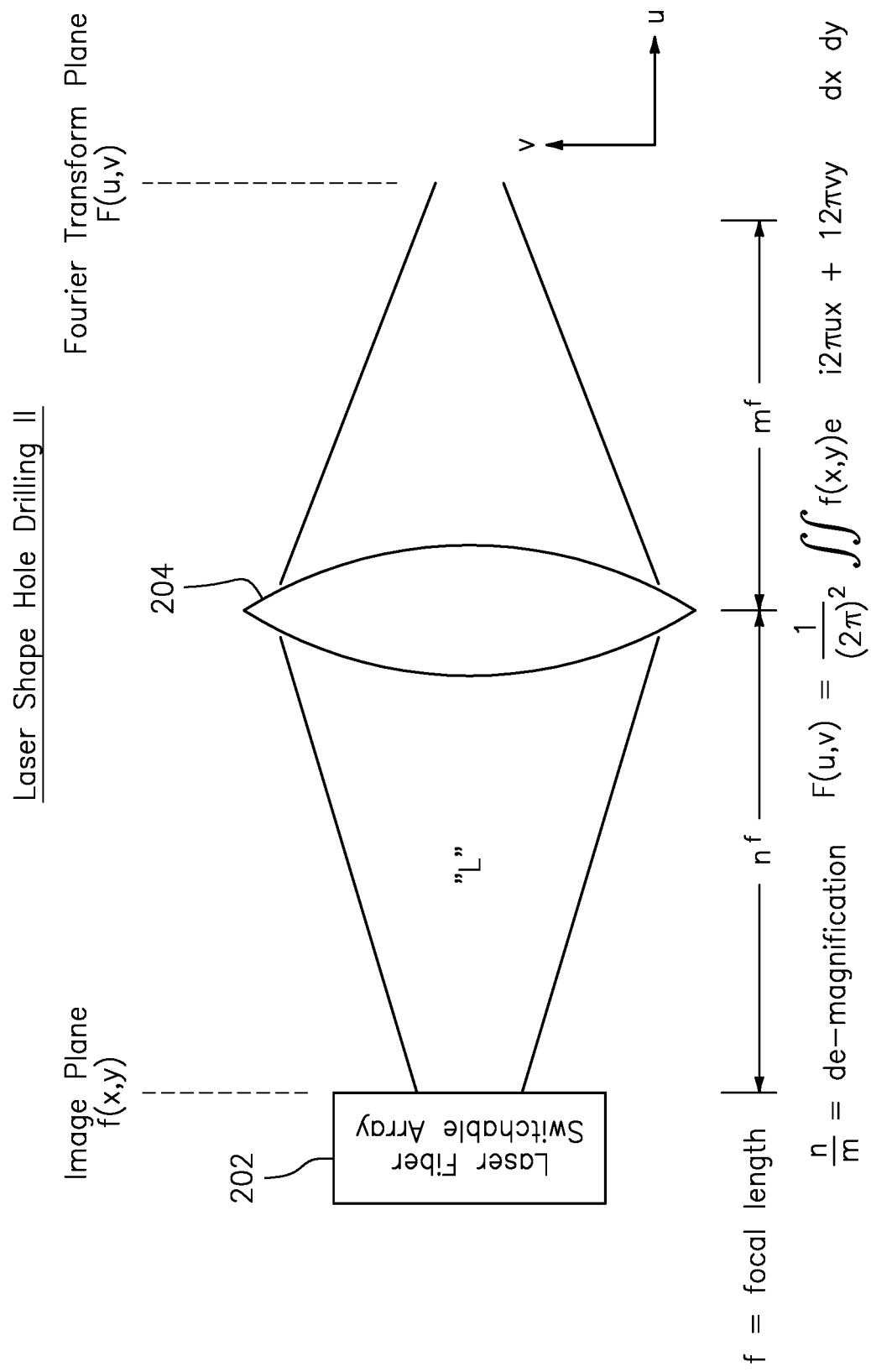
FIG. 7 is a schematic representation of the logic for the shaped cooling hole laser drilling system.

With reference to FIG. 6, a laser hole drilling system 200 according to one embodiment includes a laser source 202, a spherical lens 204 along an optical axis L, and a control system 206 therefore. The spherical lens 204 may be positioned by an articulatable support 208 in response to the control system 206 (FIG. 7). The control system 206 includes a processor 210, a memory 212, and an interface 214. The processor 210 may be any type of known microprocessor having desired performance characteristics. The memory 212 may be any computer readable medium which stores data and control algorithms such as the logic 300 as described herein. The interface 214 facilitates communication with other components such as the laser source 202 and the articulatable support 208. The functions of the logic 300 are disclosed in terms of functional block diagrams in FIG. 8, and it should be appreciated that these functions may be enacted in either dedicated hardware circuitry or programmed software routines capable of execution in a microprocessor-based electronics control embodiment.

Figure 8:
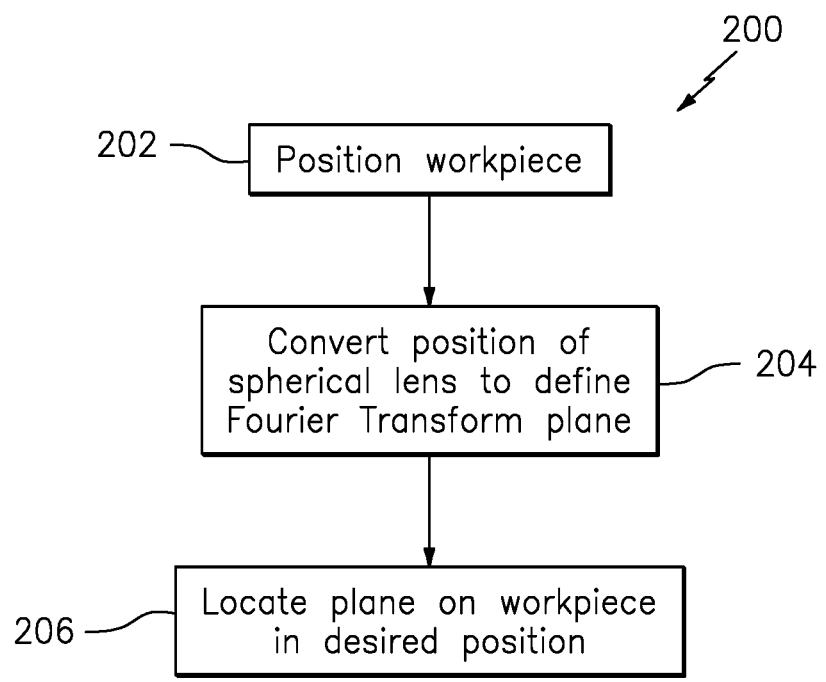
FIG. 8 is a block diagram of a method for laser drilling shaped cooling holes.

With reference to FIG. 8, an example method 300 for laser drilling the shaped cooling hole 170. The steps of the method 300 are schematically disclosed in terms of functional block diagrams as a flowchart of steps. It should be appreciated that alternative of addition steps may be provided without departing from the teaching herein.

Initially, a component, such as the blade 100, is positioned (302) with respect to the laser hole drilling system 200. The general theory of optics provides that at the focal plane of a lens, the light distribution will be the Fourier Transform of the input of the light to the spherical lens 204. The spherical lens 204, which is in a coaxial arrangement with the laser source 202, will produce a light distribution in polar coordinates of the real portion of the Fourier Transform at the Fourier Transform plane. That is, the laser plane at the laser source 202 is converted by the position of the spherical lens 204 to define the Fourier Transform plane (304) and thus the shaped cooling hole 170. Parallel rays that are off the optical axis L will map to a non-polar symmetric energy distribution. That is, the laser bean 210 propagates through the spherical lens 206 thereby introducing an asymmetric teardrop shaped energy distribution at a focal plane to drill the shaped cooling hole 170 at the desired position (206). The asymmetric teardrop shaped energy distribution thereby drills the teardrop shape cooling hole 170 at the focal plane. By controlling the focal plane the breakthrough of the respective wall 130, 132 forming the metering hole 172 while the trailing portion 174 does not breakthrough the wall 130, 132.

In another embodiment, the laser source 202 may be a laser matrix of fiber waveguide lasers in an array format controlled by the control system 206. In this embodiment, the laser matrix is controlled in laser distribution and intensity between nodes (pixels) in the array. The output of the array can be de-magnified and imaged directly onto the work piece to form the shaped cooling hole 170. That is the direct computer control of the laser matrix controls the shape of the hole to be drilled. If greater laser intensity is required, the array may be controlled to produce a pattern corresponding to the inverse Fourier Transform of the desired shape. The array energy is then directly focused (not imaged), onto the work piece. The resulting energy distribution will correspond directly to the shape of the hole to be produced.

The method for laser drilling the shaped cooling hole is inexpensive and readily incorporated into existing and future components.

The use of the terms "a," "an," "the," and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to normal operational attitude and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason, the appended claims should be studied to determine true scope and content.

What is claimed:

1. A laser hole drilling system, comprising:
a laser source that generates a laser beam along an optical axis, said laser source comprising a laser matrix of fiber waveguide lasers arranged in an array;
a spherical lens along the optical axis downstream of the laser source; and
a control system in communication with the spherical lens and the laser source, the control system configured to position the spherical lens with respect to the laser source to produce a light distribution based on polar coordinates of a real portion of a Fourier Transform of a laser plane at the laser source to generate an asymmetric teardrop shaped energy distribution at a focal plane, wherein the focal plane is located at a surface of a turbine component, and wherein the control system is configured to control the spherical lens such that the focal plane on the component results in break through of a plane of a wall of the component forming a teardrop shaped metering hole while a trailing portion of the focal plane does not break through the plane of the wall.

2. The system as recited in claim 1, wherein the spherical lens is located coaxial with respect to the optical axis.

3. A laser hole drilling system, comprising:
a laser matrix of fiber waveguide lasers arranged in an array; and
a control system in communication with the laser matrix, the control system configured to control a laser distribution and intensity between nodes in the array to produce a light distribution based on polar coordinates of a real portion of a Fourier Transform of a laser plane at the laser matrix to generate an asymmetric teardrop shaped energy distribution at a focal plane, wherein the focal plane is located at a surface of a turbine component, and wherein the control system is configured to control the spherical lens such that the focal plane on the component results in break through of a plane of a wall of the component forming a teardrop shaped metering hole while a trailing portion of the focal plane does not break through the plane of the wall.

4. The system as recited in claim 3, wherein the focal plane is located at a surface of a turbine component.

5. The system as recited in claim 4, wherein the surface is a wall of a turbine blade.

6. A method for laser drilling an asymmetric teardrop shaped cooling hole in a component for a gas turbine engine, the method comprising:
locating a component with respect to a focal plane of a laser;
producing a light distribution based on polar coordinates of a real portion of a Fourier Transform of a laser plane at a laser source of the laser to generate an asymmetric teardrop shaped energy distribution at the focal plane; and
drilling an asymmetric teardrop shaped cooling hole in the component at the focal plane, wherein the producing step comprises passing the light distribution through a spherical lens supported relative to an optical axis of the laser, and positioning the spherical lens relative to the optical axis of the laser to define an asymmetric teardrop shaped energy distribution on the component, and further comprising positioning the spherical lens relative to the optical axis of the laser such that the energy distribution results in break through of a plane of a wall of the component forming an asymmetric teardrop shaped metering hole while a trailing portion of the teardrop shape does not break through the plane of the wall.

7. The method as recited in claim 6, wherein the focal plane is located at a surface of a turbine component.

8. The system of claim 1, further comprising an articulable support supporting the spherical lens and communicated with the control system to receive commands from the control system to cause the articulable support to position the spherical lens relative to the optical axis.

* * * * *